(12) United States Patent
Chen et al.

(10) Patent No.: US 7,628,510 B2
(45) Date of Patent: Dec. 8, 2009

(54) SWITCHABLE ILLUMINATION SYSTEM

(75) Inventors: Chia-Hao Chen, Taoyuan Hsien (TW);
Bob Wang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 96 days.

(21) Appl. No.: 12/058,813

(22) Filed: Mar. 31, 2008

(65) Prior Publication Data
US 2008/0298044 A1  Dec. 4, 2008

(30) Foreign Application Priority Data
Jun. 1, 2007  (TW) .............................. 96119741 A

(51) Int. Cl.
*F21V 33/00* (2006.01)
(52) U.S. Cl. .................... 362/241; 362/247; 362/297; 362/341; 362/346
(58) Field of Classification Search ................ 362/263, 362/241, 247, 296.1, 297, 306, 341, 346
See application file for complete search history.

(56) References Cited

U.S. PATENT DOCUMENTS 6,196,699 B1 * 3/2001 Stanton ..................... 362/235
6,527,420 B1 * 3/2003 Chuang ..................... 362/346
7,090,357 B2 * 8/2006 Magarill et al. ............... 353/94
2006/0146296 A1  7/2006 Lin

FOREIGN PATENT DOCUMENTS

TW            451105          8/2001

OTHER PUBLICATIONS

Panasonic ideas for life, PT-DW7000U/U-K, DLPWXGA Projector, Native 16:0 Wide-Screen Impact, 6 pages.

* cited by examiner

*Primary Examiner*—Laura Tso
(74) *Attorney, Agent, or Firm*—Grossman, Tucker, Perreault & Pfleger, PLLC

(57) ABSTRACT

A switchable illumination system adapted to provide illumination to a device is disclosed. The switchable illumination system comprises a first light source, a second light source, a reflection module and a control module, wherein the two light sources are disposed on opposite sides of the reflection module, respectively. The reflection module is adapted to reflect the light emitted from either the first light source or the second light source to maintain normal operation of the switchable illumination system under the monitoring of the control unit.

18 Claims, 6 Drawing Sheets

SWITCHABLE ILLUMINATION SYSTEM

This application claims priority to Taiwan Patent Application No. 096119741 filed on Jun. 1, 2007, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to an illumination system, and more particularly, relates to a switchable dual-lamp illumination system.

2. Descriptions of the Related Art

In modern household audio/video products, the luminance and service life of the illumination system thereof are two quality determinant factors. For example, since a lamp is commonly used in the projection apparatus as the light source of the illumination system thereof, the luminance and service life of the lamp directly determines the imaging quality and service life of the projection apparatus. However, these two factors are in conflict with each other and difficult to achieve simultaneously. More particularly, a lamp operating with a higher luminance tends to have a shorter service life; on the other hand, if a longer service life is desired, the luminance of the lamp will have to be reduced during the use of the projection apparatus.

In order to overcome such a shortcoming and improve both the luminance and service life of an illumination system simultaneously, a dual-lamp illumination system has been proposed in the prior art in an attempt to improve both the luminance and the service life by using multiple light sources. Moreover, the dual-lamp illumination system also has an improved stability. Specifically, if one of the lamps in the illumination system fails to work during operation, the other working lamp may take its place to maintain continuous operation of the projection system.

There are currently two known kinds of dual-lamp illumination systems that can be used in projection apparatuses: the mechanically switchable dual-lamp illumination system, and the operating type dual-lamp illumination system. The former system only has one illuminated lamp at any given time, and if the working lamp fails, the backup lamp in the dual-lamp illumination system can be manually or electrically moved into the optical path using a mechanical sliding rail. However, temporary loss of the light source will occur in the projection apparatus during the lamp switching process, leading to an interruption in picture display. Furthermore, switching the lamps by means of a sliding rail entails a complicated mechanism which is typically bulky. The bulkiness is undesirable when trying to keep the size of the projection apparatus small.

In contrast, by adjusting the respective reflecting covers in the conventional operating type dual-lamp illumination system, the two lamps are illuminated simultaneously to provide light rays respectively in the optical path. However, a disadvantage of such an illumination system is that it requires a complicated optical path design, and to efficiently utilize the light rays provided by both lamps, the reflecting covers of both lamps have to be cut, molded and adjusted precisely to achieve an expected illumination profile and intensity that should have been provided by a single lamp. Moreover, both of the light rays passing through a multiple complex reflecting light paths may be destructive which leads to a low light utilization efficiency. The equivalent efficiency of either lamp is only about 60% to 70% of an original single lamp. Therefore, it is relatively difficult to obtain an improved stability of the illumination system, i.e., if one of the lamps failed to work, the complete dual-lamp light source must be replaced entirely, rather than using the remaining lamp to maintain continuous operation of the system.

As described above, if either of the lamps fails in a conventional dual-lamp illumination system, it will be difficult to provide a continuous light, thus causing instability in displaying pictures of the projection apparatus. As a result, it is important to provide an improved dual-lamp illumination system which, in addition to having improved luminance and service life, may also allow for stable operation.

SUMMARY OF THE INVENTION

One objective of this invention is to provide a switchable illumination system adapted to provide both an improved luminance and a prolonged service life. Particularly, in case one of the light sources fails, the illumination system can switch to the other light source rapidly, so that the illumination system can operate normally without any interruption. Thus, a normal output of the picture display can be maintained.

To this end, a switchable illumination system disclosed in this invention comprises a first light source, a second light source, a reflection module and a control module. The second light source is disposed on the opposite side of the first light source. The reflection module is disposed between the first light source and the second light source, and is adapted to reflect light emitted from the first light source and the second light source. The control module is adapted to detect failure of the first light source and then drive the second light source to replace the first light source to maintain a continuous normal operation of the projection apparatus.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The main concept of the switchable illumination system disclosed in this invention is to use a dual-lamp set as the light source thereof and a light source in conjunction with appropriate reflection modules and control modules depending on the different configurations of the projection apparatus to provide stable illumination. Several embodiments will be disclosed hereinbelow, which are intended to describe the detailed features of the switchable illumination system of this invention rather than to limit the scope of this invention. It should be noted that the description of the following embodiments only focuses on features associated with the illuminations system, while other parts operate in conjunction with the illumination system are substantially the same as the corresponding parts in the prior art and therefore will not be described in detail for purpose of simplicity.

Figure 1A:
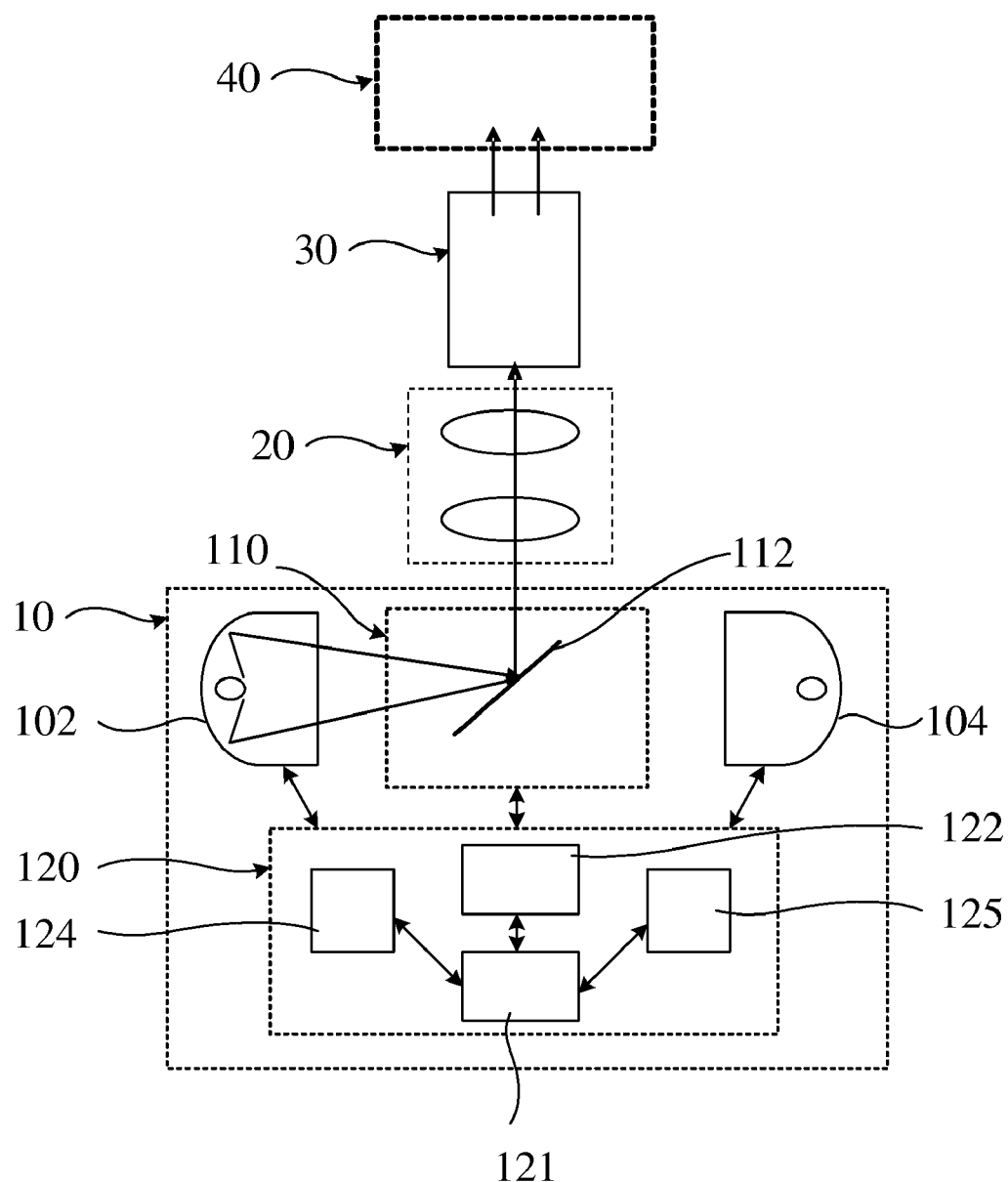
FIGS. 1A and 1B are schematic views of a reflection mirror switching from the first position to the second position in the first embodiment of this invention.

FIG. 1A illustrates the first embodiment of a switchable illumination system of this invention that can be used in a projection apparatus. The projection apparatus comprises a switchable illumination system 10, a relay lens system 20, a light integration rod 30 and an optical system 40. Once the illumination system is powered on, light emitted from the illumination system 10 enters the relay lens system 20, through which most of the light is concentrated onto the entrance of the light integration rod 30. The concentrated light then enters the optical system 40 and finally projects an image onto an imaging screen.

In more detail, the switchable illumination system 10 of this invention comprises a first light source 102, a second light source 104, a reflection module 110 and a control module 120. The first light source 102 and the second light source 104 are both lamps. The second light source 104 is disposed on the side opposite the first light source 102 with respect to the reflection module 110. In the preferred embodiment, both the first light source 102 and the second light source 104 have two elliptical reflecting covers disposed at the outer peripherals thereof to collect the light onto the reflection module 110, thus improving the utilization efficiency of the light sources.

Figure 1B:
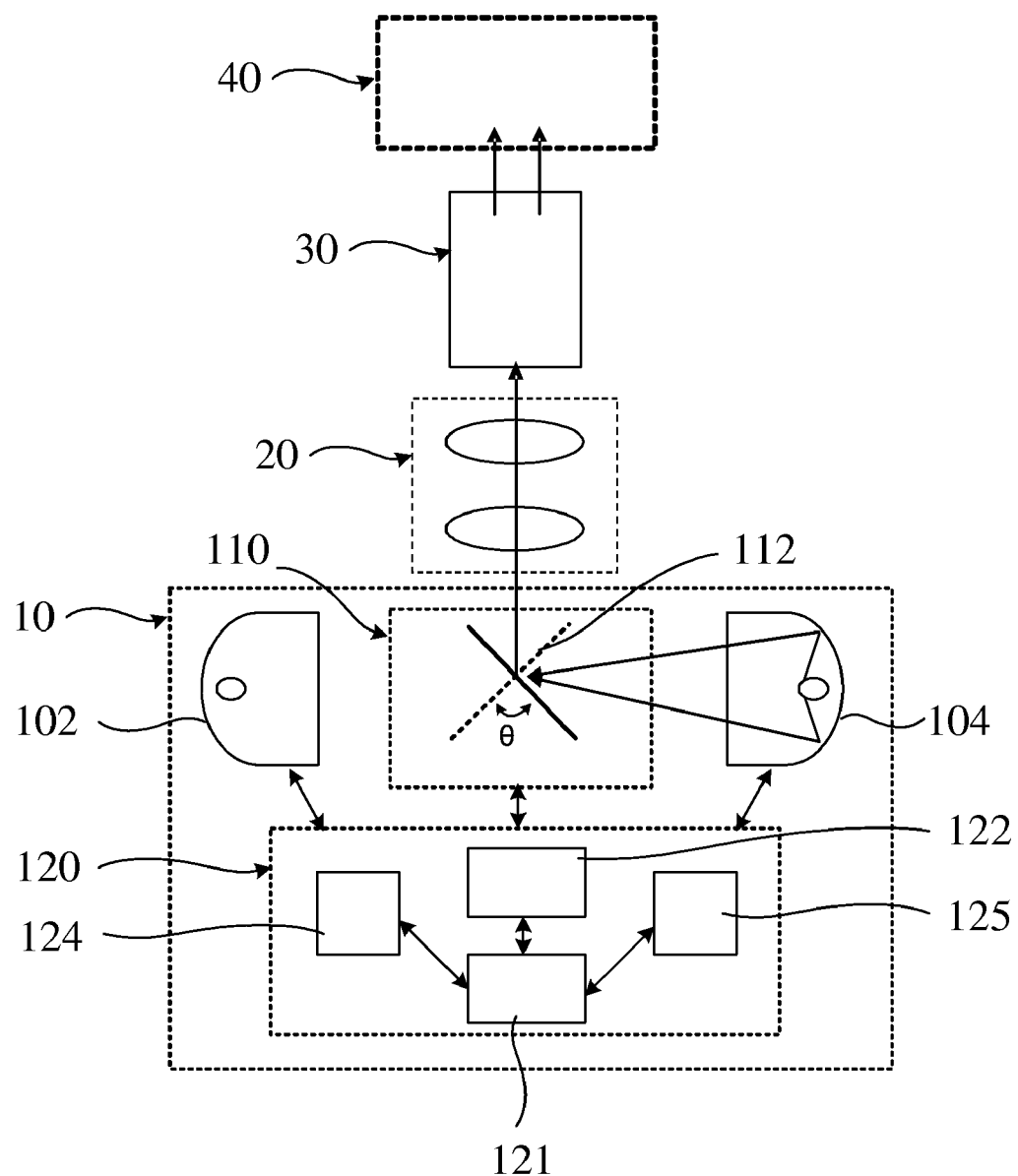

Additionally, the reflection module 110 is disposed between the first light source 102 and the second light source 104 for reflecting the light emitted from either the first light source 102 or the second light source 104, so that most of the light is projected into the relay lens system 20. The reflection module 110 comprises a reflection mirror 112 disposed between the first light source 102 and the second light source 104. A feature of the reflection mirror 112 is that it can switch rapidly between the first position, where the reflection mirror 112 reflects light emitted from the first light source 102, and the second position where the reflection mirror reflects light emitted from the second light source 104, as shown in FIG. 1B. It should be further noted that whether the reflection mirror 112 is located at the first position or the second position, light emitted from the corresponding light source can be focused onto the reflection mirror 112, so that the light is fully reflected into the relay lens system 20. In the preferred embodiment, the first position and the second position of the reflection mirror 112 include an interior angle ranging from 85° to 95°, such that light emitted from the light sources is more fully reflected into the relay lens system 20.

As described above, the illumination system 10 of this embodiment is applied to a dual-lamp projection apparatus that has a single lamp illuminated at any time. In other words, in the illumination system 10 of this embodiment, either of the first light source 102 or the second light source 104 may be selected as the active light source, while the other is used as the backup. The control module 120 is electrically connected to the reflection module 110 for detecting the status of the two light sources 102, 104, and controlling the switching of the reflection module 110. In more detail, when the second light source 104 is used as the backup light source, once the control module 120 detects an abnormal operation status of the first light source 102, the control module 120 will actuate to illuminate the second light source 104 and switch the reflection mirror 112 rapidly to the second position from the first position, so that the second light source 104 will replace the first light source 102 to maintain continuous normal operation of the projection apparatus without any interruption in the projected image.

In the preferred implementation, the control module 120 comprises a control unit 121, a driving unit 122 and two detection units 124, 125. The driving unit 122 comprises an electromagnetic valve or a stepping motor configured to rotate the reflection mirror 112 to switch rapidly between the first position and the second position. Additionally, the detection unit 124 may be, for example but not limited to, an electronic ballast, which is configured to stimulate the first light source 102 and the second light source 104 to the ignition status, and then monitor the operation status of the two light sources to send a detection signal to the control unit 121. In the above example, once the detection unit 124 corresponding to the first light source 102 detects failure of the first light source 102, it will send a signal to the control unit 121 immediately, which in turn sends an actuation signal to the driving unit 122 and the other detection unit 125 corresponding to the second light source 104. The driving unit 122 immediately drives the reflection mirror 112 to rotate from the first position to the second position. At this point, the detection unit 125 will also actuate the second light source 104 simultaneously, so that the second light source 104 can provide illumination for the projection apparatus promptly to maintain the continuous normal operation thereof.

In this embodiment, the control module 120 takes a relatively short time in detecting a failure in the light source and switching to the other light source (only about 1 second in actual application). Therefore, compared to the conventional mechanical lamp switching system using a sliding rail, the illumination system of this embodiment is simpler in structure and faster in response. Furthermore, compared to the conventional simultaneously operating type dual-lamp illumination system, the light source of this invention has a better utilization efficiency, which is improved from 60%~70% of the prior art to about 85% or even higher.

Figure 2A:
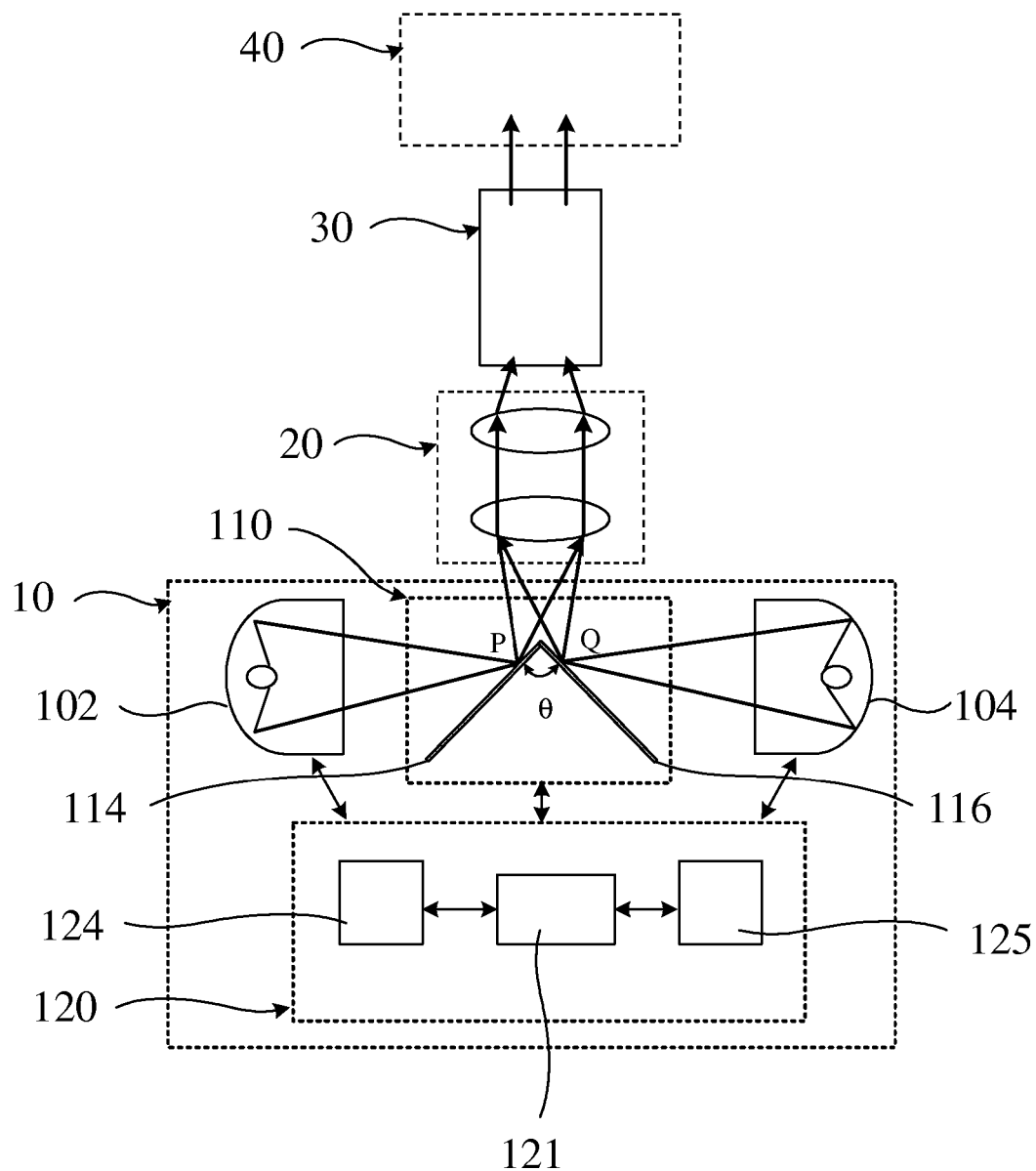
FIGS. 2A and 2B are schematic views of the second embodiment of this invention that is applied to a projection apparatus.
Figure 2B:
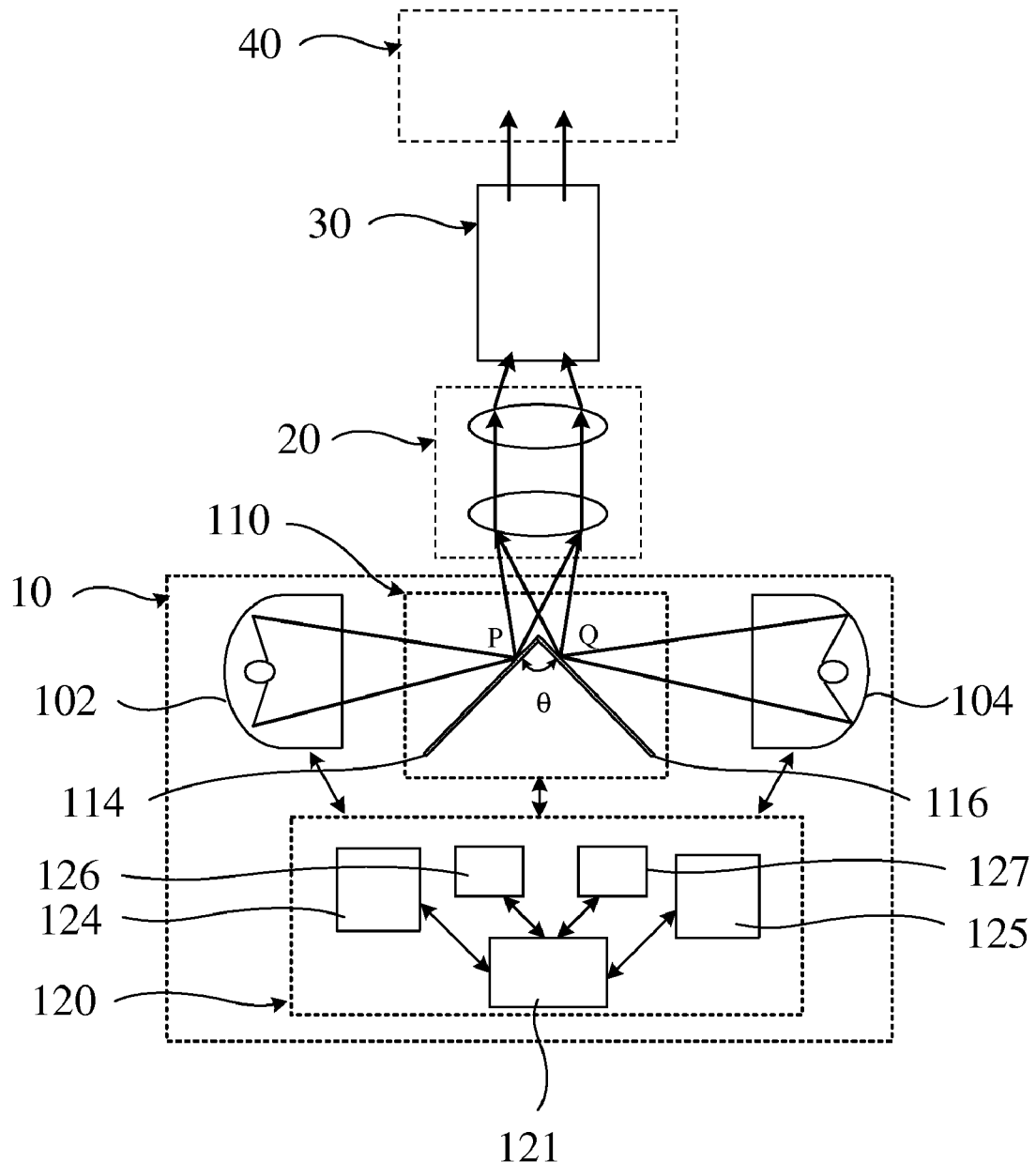

Next, FIG. 2 illustrates the second embodiment of the switchable illumination system of this invention. Similar to the first embodiment, the projection apparatus also comprises a switchable illumination system 10, a relay lens system 20, a light integration rod 30 and an optical system 40. Additionally, in this embodiment, the switchable illumination system 10 of this invention also comprises a first light source 102, a second light source 104, a reflection module 110 and a control module 120, all of which have a substantially similar space configuration as those in the first embodiment.

This embodiment differs from the first embodiment in that the reflection module 110 comprises a first reflection unit 114 and a second reflection unit 116 for reflecting light emitted from the first light source 102 and the second light source 104 respectively. The first reflection unit 114 and the second reflection unit 116 form a corner therebetween. In the preferred implementation, at least one of the reflection units 114 and 116 is a reflection mirror, and the corner θ formed therebetween is an interior angle ranging from 85° to 95°.

The illumination system 10 described in this embodiment is applicable to a dual-lamp projection apparatus where both lamps operate simultaneously, i.e., the first light source 102 and the second light source 104 of this embodiment may be used as the light source of the illuminating system 10 simultaneously or alternately. This embodiment differs from the conventional illumination system where both lamps operate simultaneously. Specifically, to collect light emitted from the light sources into the relay lens system respectively, only adjusting the focal point between the light sources 102, 104 and the respective reflection unit 114, 116 are needed. There is no need to precisely cut and adjust the reflecting covers as in the prior art. Therefore, this embodiment is simpler in structure and easier to install and adjust.

In the preferred implementation, to effectively collect most of the reflected light into the relay lens system 20, the upper border of an area formed on the reflection module by the two light sources shall be substantially adjacent to the corner vertex of the reflection units, but not exceed the vertex. For example, the light emitted from the first light source 102 travels substantially along the first principal axis to the first reflection unit 114 to form a first reflection point P of a radius about 2~3 mm thereon. The bevel edge of the reflection mirror is 28~32 mm, so the first reflection point P shall be formed at a location about one tenth of the bevel edge size from the corner.

Like the earlier descriptions, the first light source 102 and the second light source 104 are used alternately as the light source of the projection apparatus. Similarly to the above description, in reference to FIG. 2A, the control module 120 of this implementation comprises a control unit 121 and two detection units 124, 125. The detection units 124, 125 may be, for example but not limited to, ballasts, which are configured to stimulate the first light source 102 and the second light source 104 and monitor the light emitting status thereof respectively. Once the detection unit 124 corresponding to the first light source 102 detects a failure in the first light source 102, it will send a signal to the control unit 121, which in turn sends an actuation signal to the other detection unit 125 corresponding to the second light source 104. In response to this actuation signal, the detection unit 125 actuates the second light source 104, so that the second light source 104 can provide the illumination intensity necessary for normal operation of the projection apparatus promptly to maintain the continuous normal operation thereof.

Further, when both lamps operate simultaneously, the first light source 102 and the second light source 104 emit light simultaneously to provide a higher luminance for the projection apparatus. In reference to FIG. 2B, the control module 120 of this implementation mode further comprises two adjusting units 126, 127. Once the detection unit 124 corresponding to the first light source 102 detects a failure in the first light source 102, a signal is sent to the control unit 121, which in turn sends a signal to the adjusting unit 127 corresponding to the second light source 104. In response to this signal, the adjusting unit 127 will increase the illuminating power of the second light source 104 to provide the illumination intensity necessary for normal operation of the projection apparatus. The burnt-out first lamp 102 should not be replaced by the maintenance personnel until the completion of the current operation, so as to not interrupt the operation of the projection apparatus. Similarly, if the detection unit 125 corresponding to the second light source 104 detects a failure in the second light source 104, it will send a signal to the control unit 121, which in turn sends a signal to the adjusting unit 126 corresponding to the first light source 102. The adjusting unit 126 would then increase the illuminating power of the first light source 102.

Figure 3A:
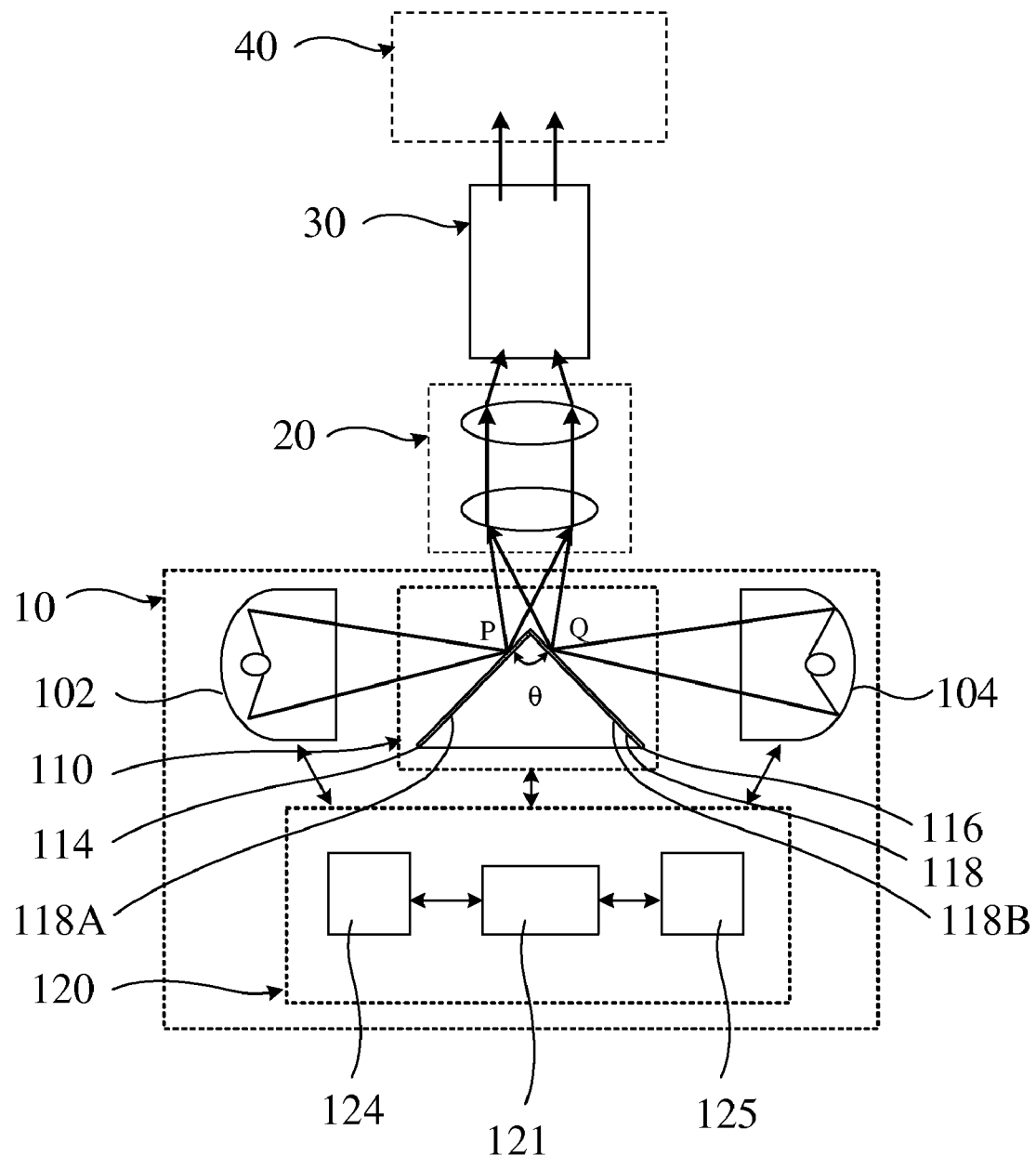
FIGS. 3A and 3B are schematic views of the third embodiment of this invention that is applied to a projection apparatus.
Figure 3B:
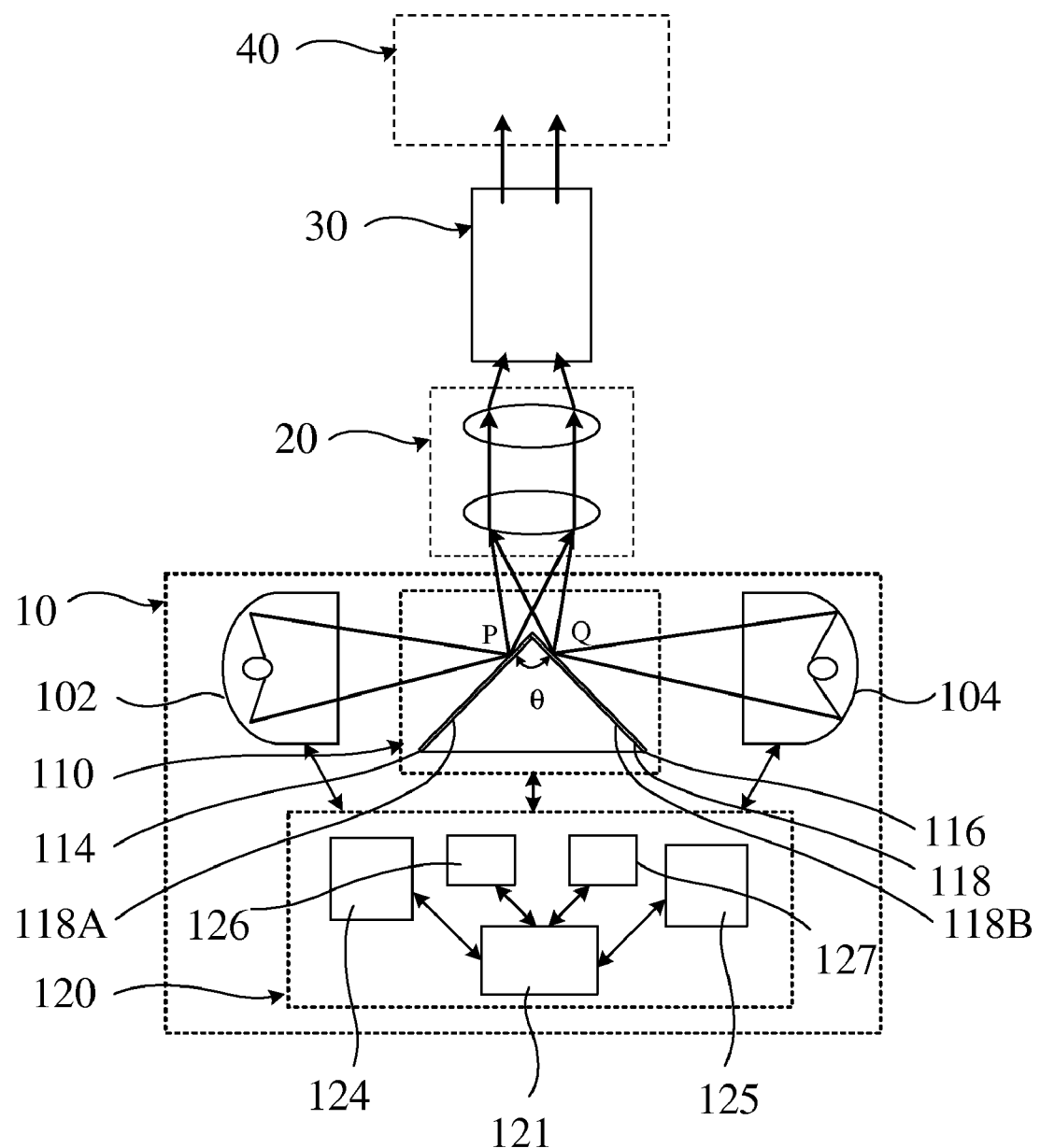

In reference to FIGS. 3A and 3B, a third embodiment of the switchable illumination system of this invention which is applicable to a projection apparatus is depicted. Most of the elements in this embodiment and the space configuration relationship thereof are much similar to those of the second embodiment. Therefore, only the difference from the second embodiment will be described hereinbelow. Any identical content, a reference of which may be made to the above description, will not be described herein again.

In the switchable illumination system of the third embodiment, the reflection module 110 additionally comprises a prism 118 with a first adjacent surface 118A and a second adjacent surface 118B adjoining each other. The first reflection unit 114 and the second reflection unit 116 of the reflection module 110 are disposed respectively on the upper surfaces of the first adjacent surface 118A and the second adjacent surface 118B. Either the first reflection unit 114 or the second reflection unit 116 is a reflection mirror or a reflection coating film. Specifically, if the first reflection unit 114 and the second reflection unit 116 are reflection mirrors, such reflection mirrors need to be inserted into the upper surfaces of the first adjacent surface 118A and the second adjacent surface 118B of the prism 118 respectively. Alternatively, if the first reflection unit 114 and the second reflection unit 116 are reflection coating films, only the desired reflection films need to be plated onto the upper surfaces of the first adjacent surface 118A and the second adjacent surface 118B of the prism 118 respectively.

Both the second and the third embodiments described above are illumination systems with both lamps operating simultaneously. As compared to the prior art, the advantage thereof is that if either of the light sources fails, the other will take its place to maintain a continuous light emitting status. In this way, the projection apparatus can still operate normally. At the same time, the operator can also replace the burnt-out light source without interfering with the normal operation of the projection apparatus. In conclusion, this invention provides a switchable illumination system that may not only have an improved luminance and a prolonged service life, but will also allow for the operational stability of the illumination system. A normal output of picture displays is thereby maintained.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A switchable illumination system, adapted to provide illumination to a device, comprising:
    a first light source;
    a second light source, disposed on an opposite side of the first light source;
    a reflection module, disposed between the first light source and the second light source, the reflection module being adapted to reflect light emitted from at least one of the first light source and the second light source; and
    a control module, detecting the first light source that operates abnormally and driving the second light source to replace the first light source to maintain the device keeps to operate normally.

2. The switchable illumination system of claim 1, wherein the reflection module comprises a reflection mirror, disposed between the first light source and the second light source, in which the reflection mirror is adapted to move from a first position where the reflection mirror reflects the light from the first light source, to a second position where the refection mirror reflects the light from the second light source.

3. The switchable illumination system of claim 2, wherein the control module comprises:
    a control unit;
    a driving unit; and
    a detection unit, detecting the first light source that operates abnormally and sending a signal to the control unit so that the control unit is adapted to actuate the driving unit to drive the reflection mirror to move from the first position to the second position and actuate the second light source.

4. The switchable illumination system of claim 3, wherein the driving unit comprises an electromagnetic valve.

5. The switchable illumination system of claim 3, wherein the driving unit comprises a stepping motor.

6. The switchable illumination system of claim 1, wherein the reflection module comprises a first reflection unit and a second reflection unit, reflecting the light from the first light source and the light from the second light source, respectively, and the first reflection unit and the second reflection unit form a corner.

7. The switchable illumination system of claim 6, wherein the control module comprises:
   a control unit; and
   a detection unit, detecting the first light source that operates abnormally and sending a signal to the control unit so that the control unit is adapted to actuate the second light source.

8. The switchable illumination system of claim 7, wherein at least one of the first reflection unit and the second reflection unit is a reflection mirror.

9. The switchable illumination system of claim 7, wherein the reflection module further comprises a prism, including a first adjacent surface and a second adjacent surface, and wherein the first reflection unit and the second reflection unit are disposed on the first adjacent surface and the second adjacent surface, respectively.

10. The switchable illumination system of claim 7, wherein the corner is an interior angle substantially between 85 degrees to 95 degrees.

11. The switchable illumination system of claim 9, wherein at least one of the first reflection unit and the second reflection unit is a reflection mirror.

12. The switchable illumination system of claim 9, wherein at least one of the first reflection unit and the second reflection unit is a reflection coating film.

13. The switchable illumination system of claim 6, wherein the control module comprises:
   a control unit;
   an adjusting unit; and
   a detection unit, detecting the first light source and the second light source and when the first light source operates abnormally, sending a signal to the control unit so that the control unit is adapted to actuate the adjusting unit to adjust an illumination power of the second light source.

14. The switchable illumination system of claim 13, wherein at least one of the first reflection unit and the second reflection unit is a reflection mirror.

15. The switchable illumination system of claim 13, wherein the reflection module further comprises a prism, including a first adjacent surface and a second adjacent surface, and wherein the first reflection unit and the second reflection unit are disposed on the first adjacent surface and the second adjacent surface, respectively.

16. The switchable illumination system of claim 13, wherein the corner is an interior angle substantially between 85 degrees to 95 degrees.

17. The switchable illumination system of claim 15, wherein at least one of the first reflection unit and the second reflection unit is a reflection mirror.

18. The switchable illumination system of claim 15, wherein at least one of the first reflection unit and the second reflection unit is a reflection coating film.

* * * * *